July 16, 1935.  C. BONAMICO  2,008,239

CINEMATOGRAPH COLOR FILM BEARING A SOUND RECORD

Filed Jan. 26, 1934

INVENTOR
Charles Bonamico
By Watson, Coit, Morse
& Grindle
ATTYS.

Patented July 16, 1935

2,008,239

UNITED STATES PATENT OFFICE 2,008,239

CINEMATOGRAPH COLOR FILM BEARING A SOUND RECORD

Charles Bonamico, London, England, assignor to Dufaycolor Limited, London, England, a British company Application January 26, 1934, Serial No. 708,489
In Great Britain February 11, 1933

6 Claims. (Cl. 95—81.5)

This invention comprises improvements in or relating to cinematograph color films bearing a sound record.

It is well known that, in the so-called talking films, the sounds are reproduced from a photographic record printed on a narrow strip about one-tenth of an inch in width at one side of the picture record. It is necessary that this strip should not have any reseau pattern or matrix thereon which might cause high frequency interruptions giving rise to very objectionable parasitic sounds or ground noise. This invention relates to an improved method whereby such a strip may—in a color film of the color screen or reseau type—be produced having substantially an ordinary black and white photographic record devoid of any color, or alternatively colored throughout in only a single color.

According to this invention a method is provided for the manufacture of a film base for use in the production of cinematograph films in natural colors and having a track for a sound record which is devoid of color or is colored throughout in only a single color wherein after a reseau has been applied to the whole width of the film, or between the application of the last two colors of a reseau having three or more colors, a resist material is applied over that portion of the film the colors of which it is desired to retain and wherein those portions of the film not protected by the resist are then decolorized.

The resist material may conveniently be a greasy ink and the dyes may be discharged by a bath comprising caustic potash in a mixture of alcohol acetone and water.

The invention will now be described, by way of example only, with reference to the accompanying diagrammatic drawing in which:—

Figure 1:
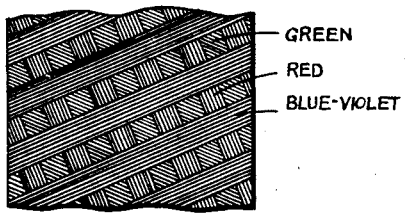
Figure 1 represents a color screen film of standard width before the operation of forming a clear sound track has been commenced and with the colored elements very greatly exaggerated.
Figure 5:
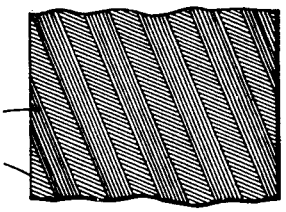
Figure 5 represents a color screen film of standard width after two of the colors have been applied and before the operation of forming a clear sound track has been commenced. The size of the colored elements is very much exaggerated.
Figure 2:
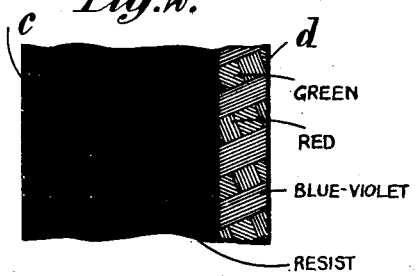
Figure 2 represents the film shown in Figure 1 after the application of the resist material.
Figure 3:
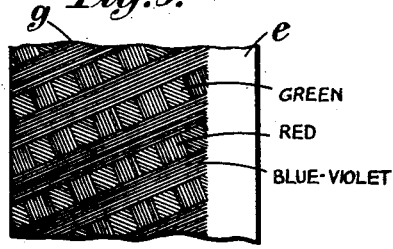
Figure 3 represents the film after the clear track has been formed and the resist material removed.
Figure 4:
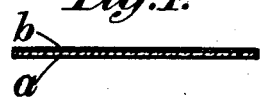
Figure 4 is a cross-section through the film.

In the example illustrated in Figures 1-4 of the drawing a color screen is first applied to a cellulose acetate film in the manner described in United States Patent No. 1,805,361. The film is thus as shown in Figures 1 and 4 where "b" is the layer of collodion bearing the dyed screen and "a" is the acetate film. A coating "c" of greasy ink is applied over the whole color screen except a strip "d" which is to serve as the sound track. The film is then passed through a dye-discharging bath which removes the dyes from the unprotected strip "d" and afterwards through a benzene bath to remove the greasy ink leaving the film with a clear track "e" and a color screen portion "g" as shown in Figure 3.

In a second example illustrated in Figures 4-8 green and red lines are first formed on the film in the manner described in United States Patent No. 1,805,361 that is to say (1) a layer of green collodion "b" is aplied to the surface of the film "a", (2) the layer is printed with fine parallel lines of greasy ink over its whole surface; (3) the green dye is bleached from between the ink lines; (4) the bleached spaces are dyed red; (5) the ink lines are removed.

Figure 6:
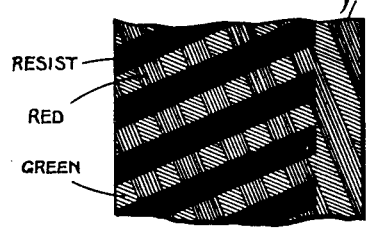
Figure 6 represents the film shown in Figure 5 after the application of a series of lines of resist material.
Figure 7:
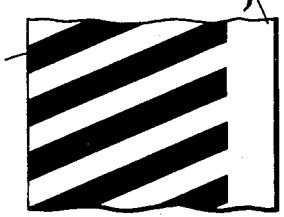
Figure 7 represents the film shown in Figure 6 after the colors have been removed from the parts not protected by the resist material.
Figure 8:
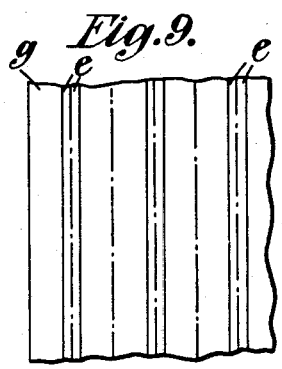
Figure 8 represents the film shown in Figure 7 with the color secreen completed and the resist removed.

The film having these red and green lines over the whole surface as shown in Figure 5 is then again printed with fine greasy lines as shown in Figure 6 at an angle to the lines of color and as described in United States Patent No. 1,805,361 only in the present case these lines do not extend over the portion "f" which is to form the sound track. The film is now subjected to a bleaching bath which bleaches the dyes from between the ink lines and also the whole of the unprotected sound track "f" leaving the film as shown in Figure 7. The film is next passed through a bath of violet dye which dyes the parts unprotected by the resist (including the strip "f"). The resultant strip after the removal of the resist is thus as shown in Figure 8 where the strip "f" is uniformly colored violet and the remainder of the strip has a completed color screen. It will be observed that this method of carrying out the invention is particularly simple in practice since it does not involve any additional step in the production of the color screen.

Figure 9:
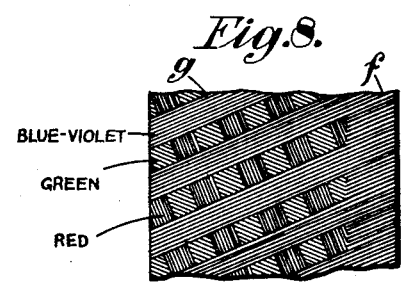
Figure 9 represents a strip of film of considerable width showing how a plurality of films of standard width may be prepared simultaneously and then divided up.

The film may be treated for the production of the sound track in a width corresponding to the finished film, or several tracks may be produced (as shown in Figure 9) suitably spaced apart in a film of considerable width and the film then cut into strips of the desired width.

I claim:—

1. The method of making a film of the multi-color screen type having at least three colors in the screen and for use in the production of sound record cinematograph films in natural colors, which comprises the steps of forming a multi-color screen having all but one of the colors of the final screen on the whole width of the film by dyeing different small areas of the film with at least two different colors, applying over the part color screen thus formed a resist material in small areas over that part of the film which is to be used for the picture areas and not at all over a narrow longitudinal strip which is to serve as a sound record track, bleaching the color from those portions of the film unprotected by the resist, and completing the screen by applying a further color to the bleached portions and then removing the resist material.

2. The method of making a film of the multi-color screen type having at least three colors in the screen and for use in the production of sound record cinematograph films in natural colors, which comprises the steps of forming a multi-color screen having all but one of the colors of the final screen on the whole width of the film by dyeing fine parallel contiguous lines on the film in at least two different colors, applying over the part color screen thus formed a resist material in fine lines over that part of the film which is to be used for the picture areas and not at all over a narrow longitudinal strip which is to serve as a sound record track, bleaching the color from those portions of the film unprotected by the resist, and completing the screen by applying a further color to the bleached portions and then removing the resist material.

3. The method of making a film of the multi-color screen type having at least three colors in the screen and for use in the production of sound record cinematograph films in natural colors, which comprises the steps of applying a cellulosic layer to the film, forming a multi-color screen having all but one of the colors of the final screen on the whole width of the film by dyeing different small areas of the cellulosic areas with at least two different colors, applying over the part color screen thus formed a resist material in small areas over that part of the film which is to be used for the picture areas and not at all over a narrow longitudinal strip which is to serve as a sound record track, bleaching the color from those portions of the cellulosic layer unprotected by the resist, and completing the screen by applying a further color to the bleached portions and then removing the resist material.

4. The method of making a film of the multi-color screen type having at least three colors in the screen and for use in the production of sound record cinematograph films in natural colors, which comprises the steps of forming a multi-color screen having all but one of the colors of the final screen on the whole width of the film by dyeing different small areas of the film with at least two different colors, applying over the part color screen thus formed a resist material in small areas over those parts of the film which are to be used for the picture areas and not at all over a plurality of spaced parallel narrow longitudinal strips which are to serve as sound record tracks, bleaching the color from those portions of the film unprotected by the resist, and completing the screen by applying a further color to the bleached portions and then removing the resist material.

5. The method of making a film of the multi-color screen type having at least three colors in the screen and for use in the production of sound record films in natural colors, which comprises the steps of applying a cellulosic layer to the film, forming a multi-color screen having all but one of the colors of the final screen over the whole width of the film by dyeing different small areas of the cellulosic layer with at least two different colors, applying over the part color screen thus formed resist material in small areas over those parts of the film which are to be used for the picture areas and not at all over a plurality of spaced narrow parallel longitudinal strips which are to serve as sound record tracks, bleaching the color from those portions of the film unprotected by the resist, and completing the screen by applying a further color to the bleached portions and then removing the resist material.

6. The method of making a film of the multi-color screen type having at least three colors in the screen and for use in the production of sound record cinematograph films in natural colors, which comprises the steps of forming a multi-color screen having all but one of the colors of the final screen on the whole width of the film by dyeing different small areas of the film with at least two different colors, applying over the part color screen thus formed a plurality of small areas of greasy ink over that part of the film which is to be used for the picture areas and not at all over a narrow longitudinal strip which is to serve as a sound record track, bleaching the color from those portions of the film unprotected by the greasy ink, and completing the screen by applying a further color to the bleached portions and then removing the greasy ink.

CHARLES BONAMICO.